United States Patent [19]

Benkmann

[11] 4,402,712
[45] Sep. 6, 1983

[54] SYSTEM FOR TREATMENT OF PLURAL CRUDE GASES IN SINGLE ADSORPTION PLANT

[75] Inventor: Christian Benkmann, Graefelfing, Fed. Rep. of Germany

[73] Assignee: Linde Aktiengesellschaft, Wiesbaden, Fed. Rep. of Germany

[21] Appl. No.: 329,476

[22] Filed: Dec. 10, 1981

Related U.S. Application Data

[63] Continuation-in-part of Ser. No. 329,102, Dec. 9, 1981, abandoned.

[30] Foreign Application Priority Data

Dec. 9, 1980 [DE] Fed. Rep. of Germany ....... 3046267
Dec. 9, 1980 [DE] Fed. Rep. of Germany ....... 3046268

[51] Int. Cl.³ ............................................. B01D 53/04
[52] U.S. Cl. .......................................... 55/26; 55/62; 55/68; 55/74; 55/179; 55/387
[58] Field of Search .................. 55/25, 26, 33, 58, 62, 55/68, 73–75, 179, 180, 387, 389

[56] References Cited

U.S. PATENT DOCUMENTS

| | | | |
|---|---|---|---|
| Re. 31,014 | 8/1982 | Sircar | 55/26 |
| 2,790,505 | 4/1957 | Dow | 55/33 |
| 2,995,208 | 8/1961 | Hachmuth et al. | 55/33 |
| 3,205,639 | 9/1965 | Johnson et al. | 55/33 X |
| 3,986,849 | 10/1976 | Fuderer et al. | 55/25 |
| 4,070,164 | 1/1978 | Miwa et al. | 55/33 X |
| 4,153,434 | 5/1979 | Settlemyer | 55/179 X |
| 4,171,207 | 10/1979 | Sircar | 55/26 |
| 4,234,322 | 11/1980 | DeMeyer et al. | 55/25 X |
| 4,280,824 | 7/1981 | Lassmann et al. | 55/33 X |
| 4,350,500 | 9/1982 | Esselink | 55/26 |

*Primary Examiner*—Robert H. Spitzer
*Attorney, Agent, or Firm*—Millen & White

[57] ABSTRACT

In a process for the separation of at least two crude gas streams of differing composition in a single pressure swing adsorption plant operated with several cyclically reversible adsorbers passing respectively through an adsorption phase, and a regenerating phase, comprising stages of expansion, purging, and pressure buildup, the improvement wherein said pressure swing adsorption plant comprises a plurality of groups of adsorbers, said groups communicating only via outlet sides thereof, and wherein each crude gas stream is associated with a single group of adsorbers through which the respective crude gas stream is conducted in a cyclically reversible fashion and separated therein, and that expansion gas is obtained at least during one stage of the expansion in one group of adsorbers is conducted into an adsorber of another group, the latter adsorber being in a regenerating phase.

15 Claims, 3 Drawing Figures

Fig. 2

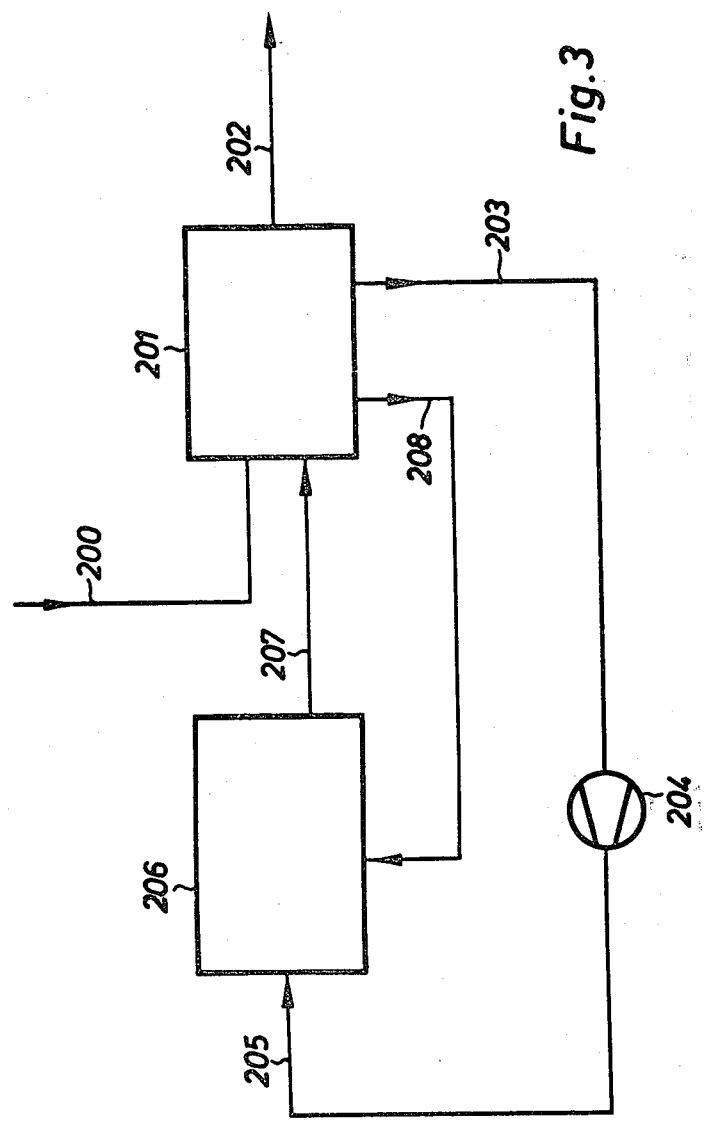

SYSTEM FOR TREATMENT OF PLURAL CRUDE GASES IN SINGLE ADSORPTION PLANT

CROSS-REFERENCE TO RELATED APPLICATION

This application is a continuation-in-part of application Ser. No. 329,102 filed Dec. 9, 1981, now abandoned.

BACKGROUND OF THE INVENTION

This invention relates to a pressure swing adsorption system for the simultaneous separation in a single adsorption plant of at least two crude gas streams having different compositions. The raw gas stream is considered to be any gaseous stream fed to the adsorption plant and separated therein.

In a conventional pressure swing process, several interchangeable and reversible adsorbers are employed in sequential phases: an adsorption phase and a regenerating phase, the latter comprising stages of expansion, purging, and pressure buildup. A pressure swing process for the treatment of two crude gas streams is disclosed in DOS [German Unexamined Laid-Open Application] 2,854,060, incorporated by reference herein along with the United States counterpart U.S. Pat. No. 4,280,824, issued July 28, 1981. In this reference, a feed gas for a chemical reaction is separated from a first crude gas stream in a pressure swing adsorption plant. This feed gas then enters a reaction zone wherein relatively incomplete reaction occurs resulting in a product stream having a high content of unreacted feed gas. The product gas is then recycled (as the second crude gas stream) into the adsorption plant to separate the desired product so that the unreacted proportions of the feed gas can be recycled into the reaction zone. In this conventional process, especially applicable to air fractionation and the separation of ozone from an oxygen-ozone mixture, the two crude gas streams are fed into each adsorber during different operating phases. In particular, either two successive adsorption phases or a pressure buildup phase and an adsorption phase are provided for this purpose.

On the basis of total crude gas fed to one adsorber, the loading of the adsorbers with different components from various crude gas streams results in a dilution of the component to be adsorbed from one crude gas by the other crude gas. This dilution effect in turn results in a lower loading on the adsorbent so that for the separation of a given raw gas, a larger quantity of adsorbent is required than would be the case if the separation of the different crude gas streams were conducted in two separate adsorption plants. Another disadvantage resides in the fact that all adsorbed components end up in the residual gas. Instead, it would be desirable, because in many cases the adsorbed components separated from the partial streams have divergent properties, for the components to be recovered separately.

Heretofore, these disadvantages were only avoidable if one pressure swing adsorption plant were employed for each raw gas stream.

SUMMARY OF THE INVENTION

An object of this invention is to provide an improved adsorption system in relation to the prior invention described in U.S. Pat. No. 4,280,824 so that the unadsorbed components of the crude gas can be obtained in a high yield.

Other objects include processes and apparatus for the improved system.

Upon further study of the specification and appended claims, further objects and advantages of the present invention will become apparent to those skilled in the art.

To attain these objects, there is provided a system wherein each crude gas stream is associated with a group of adsorbers, through which the respective crude gas stream is conducted in a cyclically reversible operation and is separated during this procedure; that each adsorber pertains to only one group; and that expansion gas obtained at least during one stage of the expansion is conducted into an adsorber of another group, the latter adsorber being in a regenerating phase. By the use of such an expansion gas, it is possible to conduct a pressure equalization step with an adsorber of another group, the latter adsorber being in the pressure buildup phase; or alternatively the expansion gas can be utilized for purging an adsorber of another group.

An essential feature of the system of this invention is the coupling of two or more adsorption facilities on the outlet side, which facilities are separated from one another on the inlet side. By this arrangement, it is possible to attain an especially high yield of the unadsorbed components of the crude gases. This high yield is based on the fact that an integrated facility according to this invention permits a finer subdivision of the regenerating phase into individual stages than is the case with a conventional single facility having in total the same number of adsorbers. The increase in the number of adsorbers obtained by integrating two adsorption facilities separated on the inlet side makes it possible to provide a larger number of pressure equalization cycles during regeneration, thus reducing the losses of the unadsorbed components. Thus, this invention permits yields that would be attainable with separate adsorption facilities for each crude gas stream having the same number of adsorbers as the integrated facilities according to this invention, but requiring considerably higher investment costs.

In one preferred aspect of the process of this invention, the residual gases produced during the desorption of the adsorbers are withdrawn in at least a partially group-wise separated manner. Consequently, in view of the varying compositions of the various groups of residual gases, more efficient utilization can be made of the separated groups of gases.

In another advantageous embodiment of the invention, the product gases discharged from the individual adsorber groups during an adsorption phase are withdrawn by way of a combined product conduit.

The process of this invention is especially suitable for the separation of two or more crude gas streams of differing composition, containing one commone component which is substantially unadsorbable, i.e., either unadsorbable or substantially less adsorbable than other components of the crude gas, and additionally various adsorbable components. In such a case, product gas can be derived from the outlet ends of the individual adsorber groups and discharged via a combined product line; moreover, separate residual gas fractions can be obtained from each adsorber group. As compared with several separate facilities, each for one crude gas, it is thereby possible, with the same investment costs, to obtain a substantially higher yield of the substantially unadsorbable component. Conversely, for the same yield of substantially unadsorbable component, the provision of complete separate facilities for each crude gas would entail considerably higher investment costs.

In the process of this invention, each individual adsorber facility comprises at least two adsorbers although the number of adsorbers within the individual facilities can be different. (In the context of this invention, when reference is made to an individual adsorber facility or group, it is to be ordinarily understood that they are connected on the outlet side but not the inlet side. The terms "groups" and "facility" are used interchangeably). In an advantageous further development of the invention, the facilities contain at least four adsorbers to ensure continuous discharge of product gas from the individual facilities.

The cycles of operation of the adsorption phase and regenerating phase each of individual adsorbers in the integrated facilities of this invention are the same as for the adsorbers of a single non-integrated facility, but they are mutually displaced in their chronological sequence. The cycles of different groups, however, can be different, as long as it is ensured that the cycles are adapted to one another with respect to the combined regenerating stages. If all groups contain the same number of adsorbers, it is especially advantageous for all adsorbers to run through identical, chronologically mutually displaced cycles.

In a particular preferred embodiment of the invention, the residual gas withdrawn during regeneration from one adsorber group is utilized as the crude gas for another adsorber group. This procedure results in particularly high yields of the unadsorbed components if the residual gas is obtained by purging the adsorbers with product-gas-rich expansion gas or directly with product gas. This process is of particular advantage in the separation of a crude gas already containing the unadsorbable component in a high concentration, because in such cases a residual gas is frequently obtained which contains the unadsorbable component still in a relatively high concentration.

An adsorption plant suitable for conduting the process of this invention comprises several groups of adsorbers, the number of which depends on the number of crude gas streams. The adsorbers of each group are connected on their inlet sides with respectively one raw gas conduit and a residual gas conduit and are in communication on the outlet side with a product gas line and with a system of pressure equalization lines and purge gas lines common to all adsorbers. The conduits are conventionally equipped with switching valves which regulate the operation of the cycles of the adsorbers.

It is frequently advantageous to connect all adsorbers with a combined product gas line and to provide, from this line, branches to the outlet ends of the adsorbers; by way of these branches, a pressure buildup of the adsorbers, suitably the last pressure buildup stage, can be effected.

The process of this invention as well as the adsorption plant of this invention can be utilized, for example, in the production of hydrogen from various raw gas streams, as well as for other gas separations, e.g. the separation of nitrogen from air and other gaseous streams, the separation of methane from streams containing light hydrocarbons, or the separation of carbon dioxide from synthesis gases or other streams.

The following description relates to a preferred embodiment of the process of this invention as it can be applied to the steam reforming of light hydrocarbons for the production of hydrogen. In steam reforming, the hydrocarbons utilized are mixed with steam and conventionally reacted in a tubular reactor in the presence of a catalyst. The energy required for the endothermic reaction is supplied by heating the reaction tubes externally. Methane is preferably used as the light hydrocarbon since this compound has a high H:C proportion than heavier hydrocarbons; however, other feeds are likewise suitable, e.g. $C_3$- or $C_4$-hydrocarbons.

The gaseous mixture formed during steam reforming consists essentially of hydrogen, carbon oxides, and small amounts of light hydrocarbons. It is, therefore, necessary to separate the hydrogen, as the desired pure product of the process, from the remaining components. Purification by a pressure swing adsorption plant is conventional for this purpose, preceded in most cases by a conversion of the carbon monoxide (in order to reduce the toxic carbon monoxide content and to increase the hydrogen content) at a high temperature with the addition of steam, producing additional hydrogen and carbon dioxide. A process of this kind is disclosed in DOS Nos. 2,911,669.

With the use of a crude gas containing light hydrocarbons as well as hydrogen, for example a refinery gas containing hydrogen and light hydrocarbons, the conventional processing technique involves, depending on the hydrogen content of the crude gas, either an upstream separation of the hydrogen in a separate fractionating unit, or conducting of the entire crude gas through the steam reforming plant whereafter the entering hydrogen is purified together with the thus-produced raw hydrogen.

Neither processing technique is fully satisfactory, since it is either necessary to provide a separate fractionating unit, e.g. a low-temperature plant, or a further pressure swing adsorption installation; or conversely, unseparated hydrogen contained in the crude gas and passed through the steam reforming plant, represents merely ballast. Whereas the first alternative requires high investment costs for the construction of a plant suitable for conducting this process, the second possibility is not only unsatisfactory from the viewpoint of thermodynamics, but the steam reforming unit must also be dimensioned to be larger than actually necessary to accommodate the ballast hydrogen.

In contradistinction, when utilizing the adsorption process according to this invention, the inadequacies of the alternative conventional processes can be avoided. For this purpose, the crude gas is fed to a first adsorber group and separated therein into a hydrogen fraction as well as a hydrocarbon-enriched fraction, the latter being fed to the steam reforming stage.

The crude hydrogen produced during steam reforming is then purified in a second adsorber group, obtaining a residual gas which can be utilized, for example, as heating gas.

The adsorption plant thus is operated in this case under such conditions that, besides the product hydrogen, two further fractions are produced, namely on the one hand the hydrocarbons separated from the raw gas, which are fed to steam reforming, and, separately therefrom, the impurities separated from the reformed gas. This latter fraction can advantageously be employed as heating gas for the steam reforming process and can be fed to the burners of the reforming reactor. An essential feature of this process is accordingly the fact that the adsorption plant yields three separate streams. Conventional adsorption plants wherein, besides the product gas, only one further fraction is discharged would not be suitable for a combined purification of the raw gas and of the raw hydrogen since in a conventional plant, besides the product hydrogen, a single residual gas fraction would be obtained containing the components of the two feed gas streams. Due to the presence of carbon oxides in this residual gas, the latter would not be suitable as the feed for a steam reforming process, since these components would damage the reforming catalyst.

BRIEF DESCRIPTION OF THE DRAWINGS

Additional details of the invention are explained with reference to the attached drawings depicting preferred embodiments of the invention, wherein:

FIG. 2 is a flowchart of the sequence of operations of the plant illustrated to FIG. 1; and FIG. 3 shows a schematic flowsheet of the invention exemplifying production of hydrogen.

DETAILED DESCRIPTION

Figure 1:
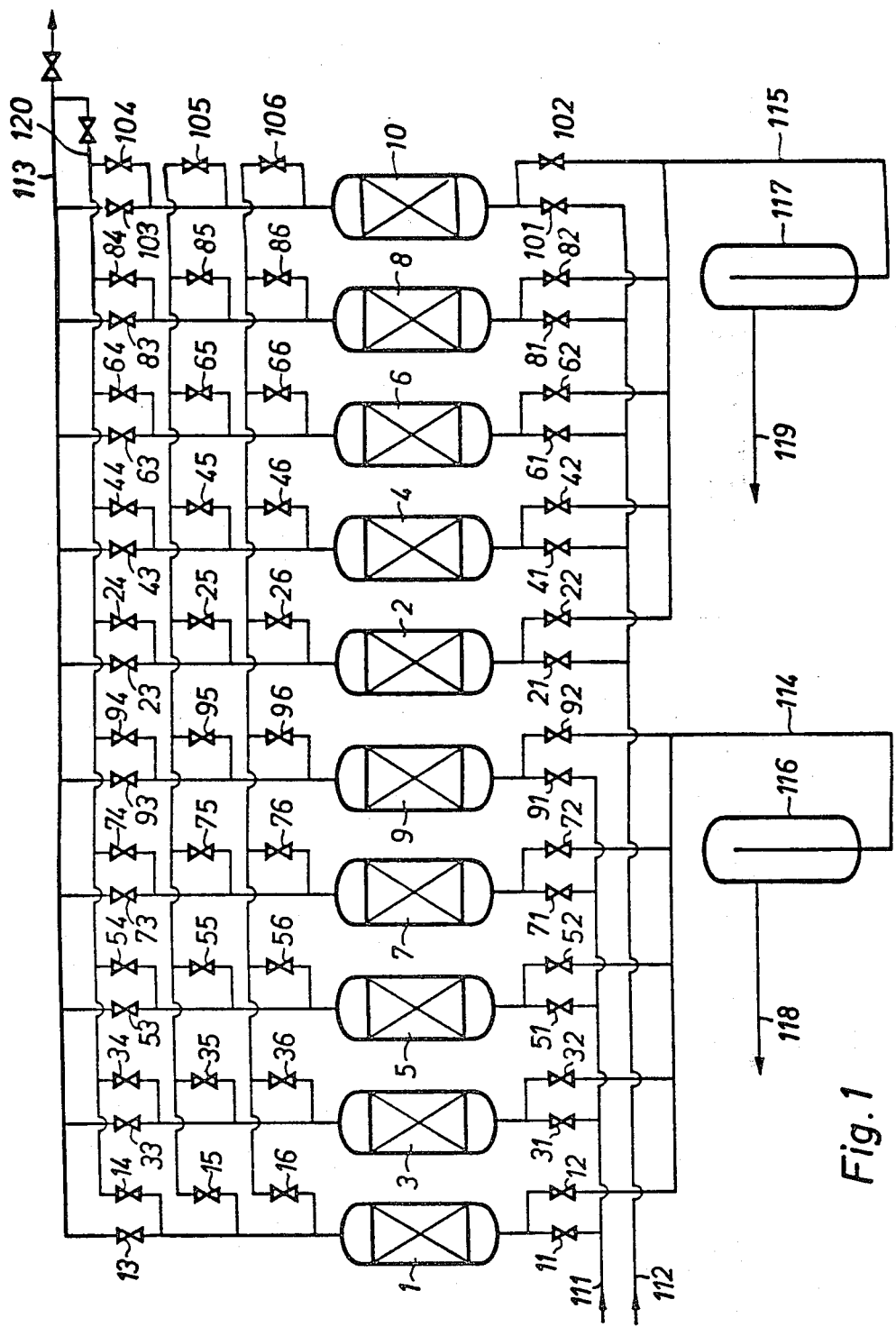
FIG. 1 is a schematic illustration of an adsorption plant having ten adsorbers, subdivided into two groups.

In the plant shown in FIG. 1, the ten adsorbers 1, 2, 3, 4, 5, 6, 7, 8, 9, 10 are divided into two groups of five adsorbers each. One group, comprising adsorbers 1, 3, 5, 7 and 9, is connected at the inlet side to a raw gas conduit 111; the other group, comprising adsorbers 2, 4, 6, 8 and 10, is in communication with a second raw gas conduit 112. The outlet ends of all adsorbers are connected to a combined product gas conduit 113.

On the inlet side, the adsorber 1 is associated with switching valves 11 and 12 and, on the outlet side, with switching valves 13, 14, 15 and 16; the individual phases of a cycle are switched over by actuating these valves. The remaining adsorbers 2-10 are correspondingly equipped with switching valves 21-26 through 101-106.

The switching valves identified by reference numbers ending with the numeral 2 on the inlet side of the adsorbers are connected for both groups separately with two residual gas conduits 114 and 115. The residual gas conduits lead into surge tanks 116 and 117, from which the residual gases are withdrawn via the conduits 118 and 119, respectively.

The sequence of operations of the individual adsorbers will be explained by using adsorber 1 as an example. The information added in parentheses AA, AB, E1-E5, S, B0-B3 relates to the individual stages of the cycle, as illustrated in the flow chart of FIG. 2.

Raw gas from conduit 111 under adsorption pressure passes through the opened valve 11 into the adsorber 1. In the latter, the more readily adsorbable components are adsorbed while the unadsorbed components leave the plant via the opened valve 13 and the product gas conduit 113. The adsorption (AA) can be conducted with the use of any conventional adsorbents, e.g. activated carbon, activated alumina, silica gel, alumina gel, and molecular sieves. The choice of the respective adsorbent depends on the type of gaseous mixture to be separated. During adsorption, an adsorption front is formed within the adsorber, this front progressing with increasing saturation of the adsorbent in the direction toward the outlet end of the adsorber. The adsorption phase (AA) is terminated before the adsorption front has reached the outlet end of adsorber 1. For this purpose, the valves 11 and 13 are closed. The gas retained in adsorber 1 is then withdrawn by pressure reduction in a first expansion stage (E1) cocurrently via the opened valve 14 and fed into the adsorber 6, which is in a third pressure buildup phase (B1), via the opened valve 64. After pressure equalization has taken place, the valve 14 is closed and the valve 15 is opened. Expansion gas (E2) which continues to exit from adsorber 1 is introduced via the opened valve 75 to the adsorber 7, which is in a second pressure buildup phase (B2). After pressure equalization has been accomplished, the valve 75 is closed and, by opening the valve 85, a third pressure equalization step is initiated with adsorber 8. The adsorber 1, during this step, passes through a third expansion stage (E3), whereas the adsorber 8 is in a first pressure buildup stage (B3).

Another expansion stage (E4) follows for adsorber 1 after the three pressure equalization stages, during which expansion gas passes, after closing valve 15, via the presently opened valve 16 and the opened valve 96, into adsorber 9. In adsorber 9, a purge step (S) is conducted, and the purge gas discharged during this step from the inlet end of the adsorber 9 is introduced into the residual gas conduit 114 via the opened valve 92. The purging of adsorber 9 by the expansion gas from adsorber 1 is then terminated by closing the valve 96, and purging is continued by opening valve 106, allowing gas to enter adsorber 10, pertaining to another group. The purge gas exiting at the inlet end of this adsorber 10 is discharged via the opened valve 102 into the residual gas conduit 115.

The four expansion stages described thus far are all effected in the adsorption direction, i.e. the expansion gas is withdrawn at the outlet end of the adsorber. Pressure buildup and/or purging of the adsorbers with the thus-produced expansion gas takes places, however, in all cases counter to the direction of adsorption.

The now substantially pressure-reduced adsorber 1 is subsequently connected, in a fifth expansion phase (E5) with the valve 16 now being closed, to the residual gas conduit 114 by opening the valve 12, and is expanded to the lowest process pressure, the purging pressure. Subsequently, purge gas obtained from the adsorber 2, which is in a fourth expansion stage is introduced via the reopened valve 26 and the likewise opened valve 16, to the outlet end of adsorber 1, so that through the still open valve 12, a residual gas is discharged via conduit 114. After completing half the purging cycle, the valve 26 is closed and more purge gas is conducted through the opened valve 36 from the adsorber 3, presently in a fourth expansion stage, into the adsorber 1. After termination of the purging phase, the valves 12 and 16 are closed and adsorber 1 is now freed of the components adsorbed in the adsorption phase (AA). Before raw gas is once again fed into this adsorber, a four-stage pressure buildup now takes place via the outlet end of the adsorber. In a first pressure buildup stage (B3), expansion gas is introduced via the opened valves 15 and 45 from adsorber 4 which is in a third expansion phase. After pressure equalization has taken place, the valve 45 is closed and, by opening valve 55, additional expansion gas from absorber 5, which is in a second expansion phase, passes into the adsorber 1. After pressure equalization has been accomplished, the valve 15 is closed. By opening valve 14, a third pressure buildup phase (B1) is initiated, during which step pressure equalization takes place with the adsorber 6, which is in a first expansion phase (E1), via the opened valve 64. Subsequently, still a fourth pressure buildup stage (B0) is conducted, during which the adsorber 1 is brought back to adsorption pressure by product gas branched off via conduit 120.

Figure 2:
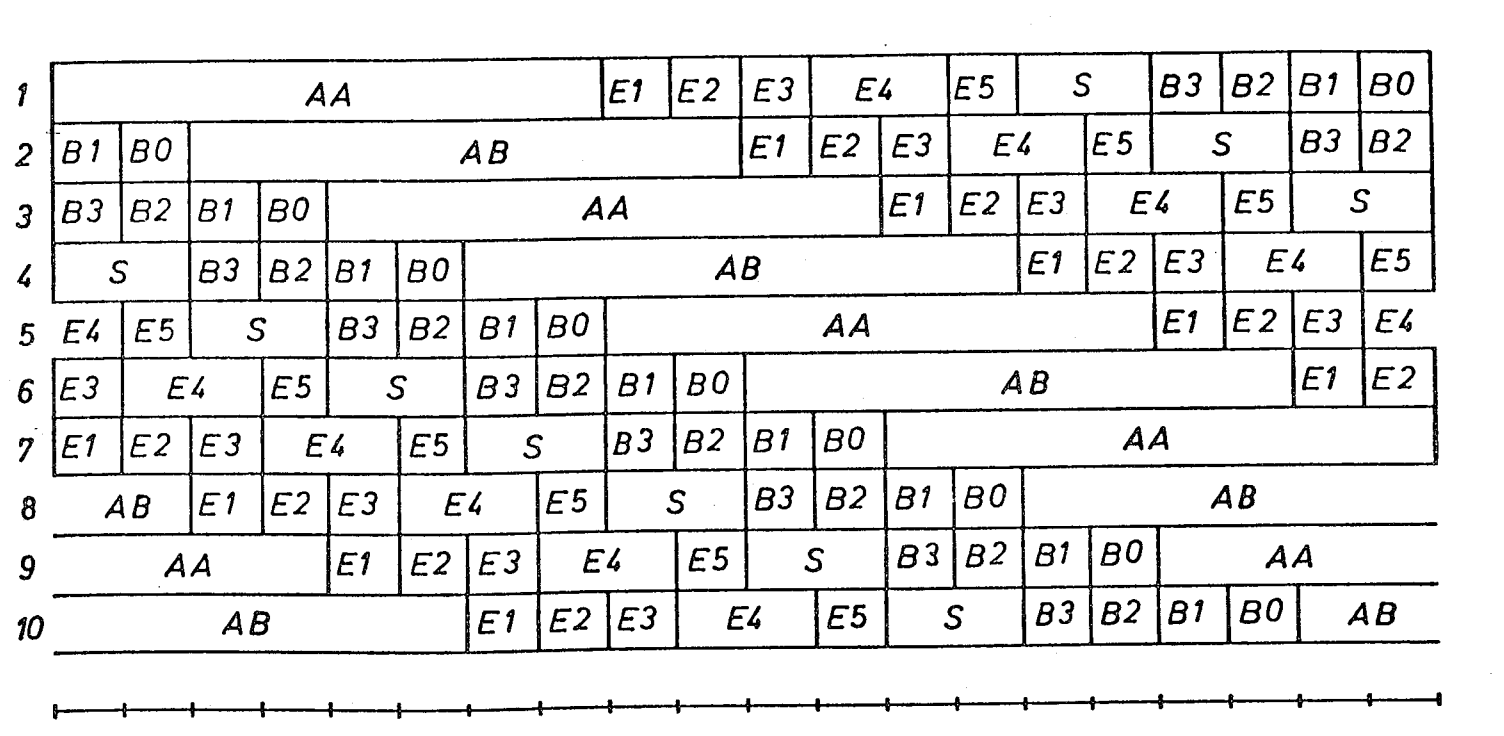

FIG. 2 is a chronological flow chart for the adsorbers 1-10 of the just-described plant. The individual adsorbers are identified by the enumerated horizontal bars arranged one below the other. The abscissa is the time axis, so that during the same time periods the adsorbers assume the designated operating modes.

Whereas the flow chart sets forth no specific times for the individual cycles, those skilled in pressure swing adsorption will appreciate that the flow chart can be adapted to changing process conditions, the crude gas composition, the desired product gas purity, etc. Thus, the particular times for each individual cycle can be varied conventionally.

The abbreviated designations set forth in the flow chart have the following meanings:

AA characterizes the adsorption phase for the crude or raw gas fed via conduit 111,
AB characterizes the adsorption phase for the second crude or raw gas fed via conduit 112,
E1 characterizes an expansion in the adsorption direction for pressure buildup B1,
E2 characterizes an expansion in the adsorption direction for pressure buildup B2,
E3 characterizes an expansion in the adsorption direction for pressure buildup B3,
E4 characterizes an expansion in the adsorption direction for purging,
E5 characterizes an expansion against the adsorption direction into the residual gas,
S characterizes a purging with expansion gas from a stage E4,
B1 characterizes a pressure buildup with an expansion gas from E1,
B2 characterizes a pressure buildup with an expansion gas from E2,
B3 characterizes a pressure buildup with an expansion gas from E3, and
B0 characterizes a pressure buildup with product gas.

With the aid of this information, it can readily be seen from the flow chart which adsorbers are in pressure equalization with each other. Thus, for example, during the first step of the adsorption cycle a pressure equalization can be seen between adsorbers 7 and 2 (stages E1 and B1), as well as 6 and 3 (stages E3 and B3). Adsorbers 5 and 4 are likewise in communication with each other during this period, expansion gas (E4) from adsorber 5 being obtained for purging adsorber 4. The adsorbers 1, 8, 9 and 10 pass through an adsorption phase during this time. Correspondingly, the adsorber switching can be determined for each step of the cycle.

As can be seen from the flow chart, four individual adsorbers are simultaneously in an adsorption phase, namely in all cases two adsorbers of each group. The adsorption phases of the individual adsorbers are displaced with respect to one another by about one-fourth of their duration, so that when the adsorption phase is terminated in adsorber 1 and the adsorption phases in adsorbers 2, 3 and 4 are still on-stream, the adsorber 5 is added on. The adsorption phases and the individual stages of the regenerating phase are the same for all adsorbers. A complete operating cycle consists of 20 steps, of which 8 make up the adsorption phase, respectively one the expansion stages E1, E2, E3 and E5, as well as the pressure buildup stages B3, B2, B1 and B0. The expansion stage E4 and the purging S, finally, comprise respectively two steps.

FIG. 3 illustrates a preferred embodiment wherein a mixture of hydrogen and light hydrocarbons, for example a refinery gas, is fed via conduit 200 and introduced into a pressure swing adsorption plant 201. The substantially unadsorbed hydrogen is withdrawn from the pressure swing adsorption plant 201 via conduit 202. During the regeneration of the adsorbers provided for the separation of the raw gas 200, a hydrocarbon-enriched residual gas is obtained which is discharged from the plant via conduit 203. This discharged residual gas is compressed in the compressor 204 to a pressure suitable for steam reforming and is thereafter passed via conduit 205 into a plant 206 for steam reforming. Steam reforming is conducted conventionally, the detailed process stages of this operation being omitted from the Figure. (Conventionally steam reforming comprises the preheating as well as the cooling of the feed and/or the reaction product, and also an optional downstream conversion of the reaction product for a further increase in the hydrogen yield.) The thus-obtained crude product hydrogen stream is finally withdrawn via conduit 207 and contains, besides hydrogen, essentially light hydrocarbons and carbon oxides. The crude product hydrogen stream is fed to the pressure swing adsorption plant 201 and separated therein into pure hydrogen product gas and a residual gas. The hydrogen is likewise withdrawn via conduit 202 and fed to a consumer, while the residual gas obtained during the regeneration of the adsorbers is discharged via conduit 208 and introduced as heating gas into the burners of the steam reformer 206.

For the details of a pressure swing adsorption plant suitable for the separation of the two gaseous streams, attention is directed to FIGS. 1 and 2 and the related description thereof.

SPECIFIC EXAMPLE

In a specific embodiment of the invention, a pressure swing adsorption plant with 10 adsorbers, which are divided into two groups of 5 adsorbers, is provided, as disclosed in FIGS. 1 and 2. A first crude gas stream comes from a low temperature unit with a temperature of 15° C. and under a pressure of 22 bar. The composition of this gas is 87.3% of hydrogen (here and furtheron always percent by volume), 2.5% of nitrogen, 8.1% of carbon monoxide, and 2.1% of methane, and it is fed to a first group of adsorbers in an amount of 2860 kmol/h. The second group of adsorbers is supplied with a feed gas which consists of a mixture of two gases, the first one being 600 kmol/h of raw hydrogen which is contaminated with 19.6% of carbon dioxide, 3.0% of carbon monoxide, and 2.5% of methane. This gas stream is produced by steam reforming of LPG and subsequent conversion of carbon monoxide. The second part of the feed gas for the second group of adsorbers is recompressed residual gas coming from the first group of adsorbers in an amount of 631 kmol/h. After mixing these gases, the second group of adsorbers is fed with 1231 kmol/h of a gas containing 58.4% of hydrogen, 5.5% of nitrogen, 20.6% of carbon monoxide, 6.2% of methane, and 9.3% of carbon dioxide, having a temperature of 15° C. and a pressure of 22 bar. Residual gas in an amount of 654 kmol/h is released from the second group of adsorbers at a pressure of 1.5 bar. Its composition is 22.0% hydrogen, 10.1% nitrogen, 38.8% carbon monoxide, 11.6% methane, and 17.5% carbon dioxide, and it is used a fuel gas. Both groups of adsorbers are connected to a common hydrogen product line from which 2806 kmol/h of hydrogen which is only contaminated by 0.3% of nitrogen is withdrawn. The hydrogen yield of this process is 95%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the separation of at least two crude gas streams of differing composition in a single pressure swing adsorption plant operated with several cyclically reversible adsorbers passing respectively through an adsorption phase, and a regeneration phase comprising stages of expansion, purging, and pressure buildup, the improvement wherein said pressure swing adsorption plant comprises a plurality of groups of adsorbers, said groups communicating only via outlet sides thereof, and wherein each crude gas stream is associated with a single group of adsorbers through which the respective crude gas stream is conducted in a cyclically reversible fashion and separated therein, and that expansion gas obtained at least during one stage of the expansion in one group of adsorbers is conducted into an adsorber of another group, the latter adsorber being in a regenerating phase.

2. A process according to claim 1, wherein during a regenerating phase, at least one pressure equalization stage occurs between adsorbers of different groups.

3. A process according to claim 1, wherein the purging of an adsorber in one group is conducted with expansion gas obtained during the expansion of an adsorber of another group.

4. A process according to claim 1, wherein the product gases withdrawn from the adsorber groups during an adsorption phase are withdrawn together through the same conduit.

5. A process according to claim 4, wherein residual gases obtained during a desorption phase from the adsorber groups are withdrawn at least in part separately from one another in different conduits.

6. A process according to claim 1, wherein a pressure buildup with product gas is conducted during the last stage of the regenerating phase.

7. A process according to claim 1, wherein residual gases obtained during a desorption phase from the adsorber groups are withdrawn at least in part separately from one another in different conduits.

8. A process according to claim 1, wherein residual gas from one adsorber group is fed to another adsorber group as a crude gas stream.

9. A process according to claim 1, wherein each group contains at least four adsorbers.

10. A process according to claim 1, wherein all groups contain the same number of adsorbers.

11. A process according to claim 10, wherein each adsorber passes through identical cycles which are chronologically displaced with respect to one another.

12. A process according to claim 1 for obtaining hydrogen from a crude gas which contains hydrogen and hydrocarbons, comprising steam reforming of the hydrocarbons and downstream adsorptive separation of the thus-produced hydrogen, wherein the crude gas is fed to a first group of adsorbers and the crude hydrogen produced by the steam reforming is fed to a second group of adsorbers; product pure hydrogen is withdrawn from the outlet ends of the adsorbers of both adsorber groups; and residual gas obtained during the regeneration of the first adsorber group is discharged as a feed for the steam reforming, and residual gas obtained during the regeneration of the second adsorber group is discharged as a heating gas for the steam reforming.

13. An adsorption plant for conducting the process according to claim 1, comprising at least two groups of adsorbers, wherein the adsorbers of each group are connected on their inlet sides with respectively one crude gas conduit and with a residual gas conduit, and wherein the adsorbers are connected on their outlet sides with a product gas conduit and further comprising pressure equalization conduit means and purging gas conduit means common to all adsorbers.

14. An adsorption plant according to claim 13, further comprising product gas conduit means in communication with all of the adsorbers.

15. An integrated plant for the production of raw hydrogen by steam reforming, comprising a steam reformer having an inlet end, burners for the heating of the steam reformer, an adsorption plant comprising two groups of adsorbers, wherein the adsorbers of each group are connected on their inlet sides with respectively one crude gas conduit and with a residual gas conduit, and wherein the adsorbers are connected on their outlet sides with a product gas conduit and further comprising pressure equalization conduit means and purging gas conduit means common to all adsorbers, the residual gas conduit pertaining to the first adsorber group leading to the inlet end of the steam reformer, and the residual gas conduit pertaining to the second adsorber group leading to burners for the heating of the steam reformer.

* * * * *